May 26, 1959 H. CARTOUX ET AL 2,888,156
AUTOMATIC FEED DEVICE FOR INDUSTRIAL APPARATUS
Filed Sept. 27, 1954 2 Sheets-Sheet 1
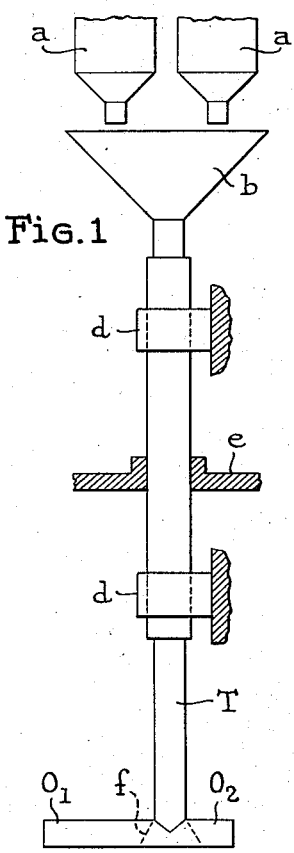
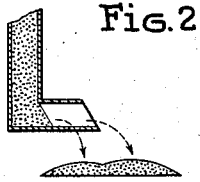
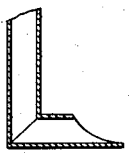
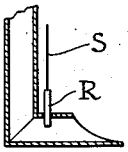
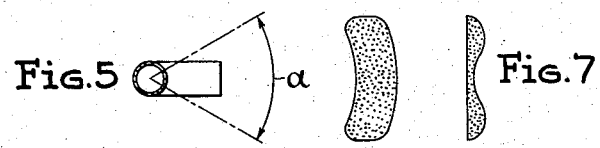
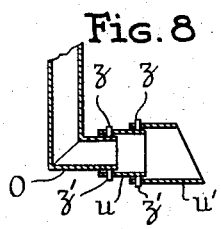
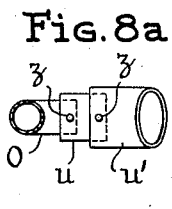
INVENTOR
Henri Cartoux
and Pierre Freyssinet
BY *Raphael Tausored*
ATTORNEY May 26, 1959     H. CARTOUX ET AL     2,888,156
AUTOMATIC FEED DEVICE FOR INDUSTRIAL APPARATUS
Filed Sept. 27, 1954     2 Sheets-Sheet 2
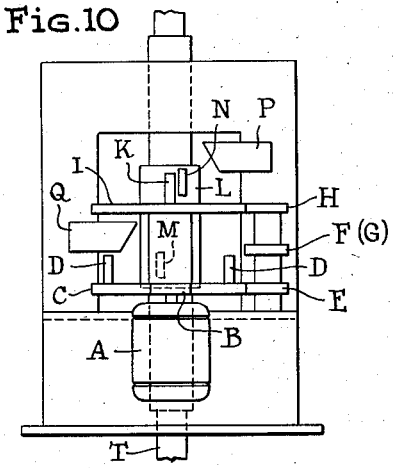
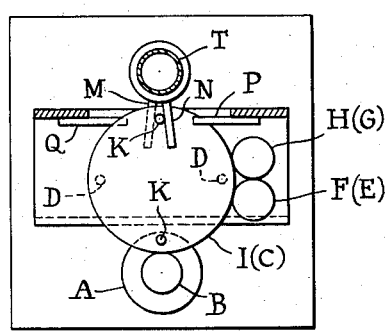
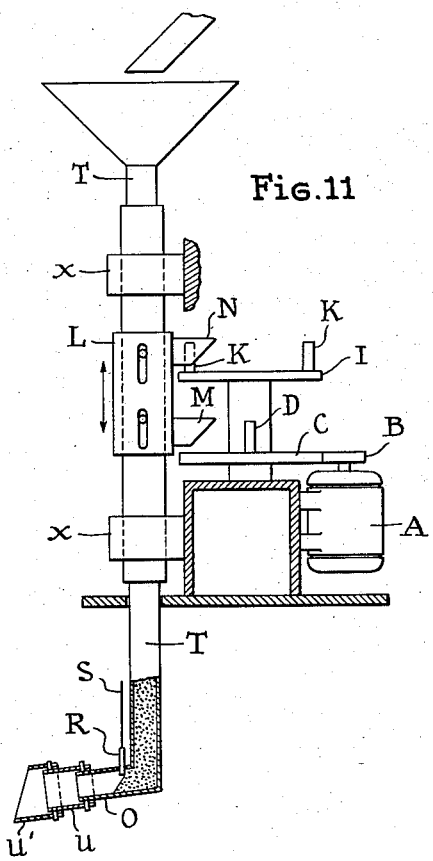
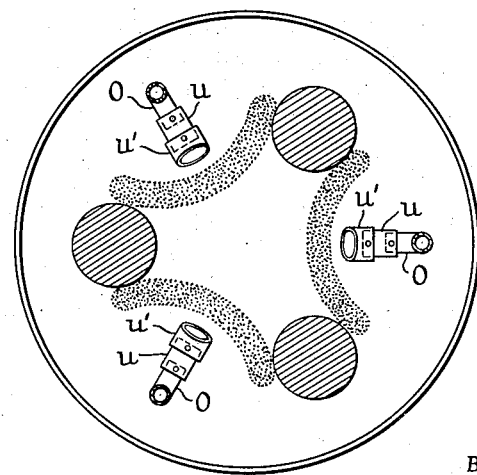
INVENTOR
Henri Cartoux
and Pierre Freyssinet
BY
ATTORNEY

United States Patent Office

2,888,156
Patented May 26, 1959

2,888,156

AUTOMATIC FEED DEVICE FOR INDUSTRIAL APPARATUS

Henri Cartoux and Pierre Freyssinet, Chedde, France, assignors to Pechiney, Compagnie de Produits Chimiques et Electrometallurgiques, Paris, France, a corporation of France Application September 27, 1954, Serial No. 458,614

Claims priority, application France October 27, 1953

6 Claims. (Cl. 214—18)

The present invention—which is based on applicants' researches—relates to a simple arrangement for continuously charging industrial apparatus with powdered materials, materials having a fine particle distribution, grains, or lumps. Apparatus to be fed by means of the device under consideration are those which necessitate a distribution of the charge over a certain surface, for example, various furnaces for the treatment of powdered products or products in small lumps such as minerals, lime, alumina, dolomite, sand, etc.; conveying apparatus of the type using a conveyor belt so that the width of the belt may be utilized to a maximum extent; screening apparatus the yield of which is increased by a better distribution of the material on the screening surface, etc.

In a general way the arrangement, which is the object of the present invention, replaces the manual or automatically operated shovel which is always irregular in its operation, or projection by means of a rake or buckets, by a continuous distribution of material falling as a uniform shower on the surface to be covered. The device, according to the invention, makes it possible to preserve at any point the desired proportions of the various constituents, and likewise assures mixture thereof. It is simple, robust, compact, and can be readily adapted to each particular case necessitating the feeding of solid, divided material. Essentially, in the arrangement according to the invention, the materials to be fed are contained in a (sliding) cone having a natural slope (angle of repose), and are projected outside by centrifugal force.

In order that the invention may be better understood, reference is had to the annexed drawings which illustrate diagrammatically the principle of the distributing apparatus, several variants of the ejector used therein, and the shape of the resultant zones of the spread (scattered) material. The drawings further illustrate an example to be described further on, of a special arrangement for producing a limited alternating rotary (i.e. oscillating) drive, as well as a way of mounting multiple feeding systems in the case of three-phase electric furnaces provided with vertical electrodes.

In the drawings:

Figure 1 is a front view of a device according to the invention;

Figure 2 is a view in cross section of the lower portion of the device showing one form of a tubular ejector according to this invention;

Figures 3 and 3a are, respectively, a cross section and plan of a modified ejector;

Figures 4 and 4a are, respectively, a cross section and a plan of a still different form of ejector;

Figures 5, 6, and 7 illustrate the operation of still another embodiment of an ejector;

Figures 8 and 8a, respectively represent in cross section and plan views still a different variant of ejector tube;

Figure 9 illustrates the operation of the device shown in Figures 8 and 8a;

Figure 10 is a partial front view of an apparatus particularly intended for charging an electric furnace;

Figure 11 is an end view—partly in section—of the apparatus of Figure 10, while

Figure 12 is a top plan view thereof;

Figure 13 illustrates, in horizontal section, an apparatus for charging a three-phase electric smelting furnace.

In the various figures, the same or similar parts are designated by the same reference numerals.

Essentially, the apparatus shown in Figure 1 is constituted of a vertical tube or conduit T provided at its upper end with a charging hopper $b$ and with ejection orifices $O_1$ and $O_2$ at its base. The conduit is supported by bearings $d$, and can be given a rotary movement about its axis by means of a driving element $e$.

The hopper $b$ at the upper end is fastened to the conduit and rotates with it. It receives the material to be charged from one or more fixed hoppers $a$ which are mounted side by side or in cascade (series).

The ejection orifices can be formed by means of one or more tubes which, as shown, can be of different lengths and which are welded to the base of the conduit T, and have a diameter substantially equal to that of conduit T, and the axes of which are either horizontal or slightly inclined to the horizontal.

When the apparatus is stationary, the material charged into the hopper $b$ fills the conduit T and forms at its lower end a sliding or slipping cone $f$, having a slope corresponding to the angle of repose of the material. The shortest ejection tube has a length greater than that of the horizontal projection of the cone; as a result, the material cannot leave the apparatus. It is unnecessary, therefore, to provide a device for stopping the flow, since the latter ceases automatically as soon as the apparatus is at rest.

When a sufficiently rapid rotary movement is imparted to the conduit T about its axis, centrifugal force acts on the material forming the cone and projects it outside. The destroyed cone tends to be reformed by the flow of the material through the conduit T and this process continues as long as the motion of the apparatus continues.

When the conduit T is subjected to a continuous rotary movement, the grains of the material follow a spiral course in the ejector tube and, thereafter, escape tangentially to the spiral and are distributed in a spray or rain over the horizontal surface situated below the apparatus. Each ejector tube distributes (spreads) the material over an area having the form of a ring of a definite width, the diameter of which depends on the speed of rotation and length of the ejector. By suitably calculating the number of ejector tubes and the individual lengths thereof, it is possible to obtain a substantially constant thickness of material over the entire surface covered.

The composition of the material at each point of the layer will be that of the mixture charged into the movable hopper. When it is desired to spread a mixture of various products, each of the constituents of the mixture is charged in one of the fixed hoppers $a$ situated above the movable hopper $b$. These hoppers $a$ discharge into the movable hopper $b$ during the operation of the apparatus and cause a mixture of the constituents. But when the apparatus is at rest, a cone having a slope corresponding to the angle of repose of the particular material is formed between the outlet of the fixed hoppers and the surface of the product in the movable hopper, and stops the flow. Accordingly, it is not necessary to provide any other flow stopping means in the hoppers.

The continuous rotation of the conduit T leads to a circular distribution of the material over the area to be charged but, very often it is necessary to have an approximately rectangular distribution, especially, in the case of furnaces, for example, between two electrodes of an electric furnace.

Such a distribution pattern is obtained by imparting to the conduit T a limited circular motion, alternating in direction, i.e. an oscillating motion of a suitable amplitude. In that case, only a single ejector tube is generally used. The material is projected over a surface having the shape of a sector of a crown, which practically coincides with a rectangle (cf. Figures 5, 6, 7).

Whether the movement be alternating or continuous, it is frequently desirable to modify the form of the ejector.

Many variants are possible without departing from the scope of the invention provided that they be based on the same principle of dispersing a sliding cone by centrifugal force.

The form of the ejected tube may also be modified in a simple manner, as follows: Figure 2 represents a tubular ejector comprising a perforation (opening) on its lower generatrix. Several such openings may be provided. It is necessary that the opening nearest to the axis of the vertical conduit be placed beyond the sliding cone. These openings are provided (designed) to enable the spreading of the material towards the center of the charging area.

Figure 3 shows a form of a shaped ejection orifice, the end of the tube being enlarged or flattened in order to modify the pattern of the charge (spread material).

Figure 4 exemplifies the use of a feed regulator, formed by a movable damper, for throttling the ejector tube. This damper may be controlled during the operation by a control rod S.

Figures 6 and 7 show in plan and in end views the shape of a distribution (covered) zone obtained by an ejector (Fig. 5) which is given an alternating circular-oscillating-movement of a limited angle alpha. The end view shows the slope (angle of repose) formed at the ends of the distribution zone.

Formation of this slope can be substantially, completely suppressed by providing the end of the ejector with the pivoted members shown in Figure 8. These are constituted of two relatively short sleeves $u$ and $u'$. The sleeve $u$, the internal diameter of which is somewhat larger than that of the external diameter of conduit O, surrounds the latter slightly and can pivot thereon by means of two vertical pins $z$, $z'$. The tube $u'$ is pivotally mounted on $u$ in the same manner, i.e. by the pins $z$, $z'$. At the instant when the motion of the vertical tube is reversed, the pivoted tubes $u$ and $u'$ swing by inertia and the projected material continues to spread further, thus avoiding formation of a slope.

When the ejector is provided with several pivoted members, the axis of the ejector should be perpendicular to the automatic feed, as shown in Figure 8. Frequently, however, it is advantageous to give it an inclination of the order of 8 to 10° below the horizontal plane, as shown in Figure 11.

There are numerous mechanical means which are suitable for imparting an alternating rotary movement to the tube T about its axis: a rack, connecting rod and crank, etc. The one described in the following example gives good results but is not given by way of limitation:

Example I

The apparatus shown in Figures 10, 11 and 12 is one intended for feeding an electric furnace. The vertical conduit traverses the cover of the furnace, and the single ejector spreads the mixture of ground mineral and other materials necessary to the operation over a rectangular-shaped area between the ends of the two electrodes of the furnace.

A frame fixed to the furnace cover supports the movable conduit T by means of bearings $x$, $x$ which permit rotation thereof; and electric or pneumatic motor A rotates, through the intermediary of gear B, the toothed plate C which carries two vertical, diametrically opposed pins D. By means of the gears E, F, G, H, the plate C drives at the same speed, but in the opposite direction, the upper plate I which likewise carries two pins K. The gears are so positioned that, when the line joining the pins K passes through the axis of tube T, the line joining the pins D are perpendicular to this direction, as shown in Figure 12, and vice versa.

The conduit T carries a sliding sleeve L provided with two members M and N having sloping outer ends and against which press alternately pins D and K respectively. As a result, the conduit is subjected to an alternating movement about its axis. The amplitude of this movement is limited by fixed stops P and Q. The amplitude of the alternating, i.e. oscillating, movement of conduit T can be regulated by sliding the sleeve L on conduit T, the sleeve being retained in adjusted position by any suitable means, such as wing nuts, etc. (not shown). It will be apparent, that by reason of the sloping sides of elements M, N, the duration of each individual contact of the latter with pins K, D, respectively, and hence, the amplitude of the oscillation of conduit T, will depend on the vertical position of sleeve L. By means of this control, it is possible to distribute the material on areas which can vary in the ratio of 1 to 4.

The single ejector is provided with the pivoted elements $u$ and $u'$ described above, and with the control damper R actuated by the rod S.

The lower part of the device which operates inside the furnace is made of a refractory metal, which is selected to resist the temperature and the atmosphere of the furnace which is being charged.

The apparatus is very simple, occupies a restricted space, and the movable part is light so that the inertia forces, set in operation at the time when the movements are reversed, do not produce large stresses. Nevertheless, the output is considerable.

Such an arrangement, using a tube 90 mm. in diameter, makes it possible to feed the furnace at the rate of 40 tons per day, stoppages included, with materials such as mineral and lime passing a 3 mm. mesh screen. In a continuous operation extending over 24 hours, this output is at least 60 tons.

Example II

Figure 13 shows a horizontal section of a device for feeding a three-phase smelting furnace provided with vertical electrodes. In order to distribute the charge symmetrically, there are mounted on the cover of the furnace three devices similar to the one described in Example I, each feeding between two electrodes.

In a case of a reduction furnace, each of the three distributors is placed not between the electrodes, but to the rear of each of them so as to deposit the charge at the base of the electrode, i.e. at the place where the arc has its maximum effect and where the fusion speed is also at a maximum.

The term "comminuated material" as used in the appended claims, comprehends all divided solid material regardless of particle size, i.e. whether in the form of lumps, grains, powder, etc.

We claim:

1. Apparatus for conveying comminuted solid material from an elevated supply hopper to a treating zone at a lower level and spreading it therein in a predetermined pattern, comprising, in combination: a supply hopper, a vertical conduit associated with the hopper for receiving at its upper end the comminuted material discharged from said hopper; at least one tubular ejector attached to and in communication with the lower open end of said conduit, the longitudinal axis of said ejector being disposed at an angle to the vertical axis of said conduit; means for imparting oscillating motion to said conduit about its vertical axis, whereby comminuted material conveyed by gravity from the hopper through said conduit passes into the ejector and is discharged therefrom by centrifugal force, and is spread in a predetermined pattern over the treating zone.

2. Apparatus according to claim 1, comprising means for controlling the extent of said oscillating motion.

3. Apparatus according to claim 1, comprising a plurality of spatially disposed vertical conduits, whereby the comminuted material is distributed in a predetermined pattern over a plurality of spatially disposed zones.

4. Apparatus according to claim 1, wherein the tubular ejector comprises a first section fastened to the lower end of the conduit, and a second section, and means mounting the second section of the first section for limited pivotal horizontal movement thereon.

5. Apparatus according to claim 1, provided with means for controlling the discharge through said ejector.

6. Apparatus according to claim 1, wherein the tubular ejector is provided with a discharge opening transverse to its longitudinal axis and a discharge opening in the bottom thereof.

References Cited in the file of this patent

UNITED STATES PATENTS

| | | |
|---|---|---|
| 681,801 | Lovejoy | Sept. 3, 1901 |
| 833,704 | Whipple et al. | Oct. 16, 1906 |
| 859,120 | Schmidt | July 2, 1907 |
| 1,065,960 | Murray | July 1, 1913 |
| 1,809,497 | Thompson | June 9, 1931 |
| 2,505,194 | Loss | Apr. 25, 1950 |
| 2,529,583 | Adams | Nov. 14, 1950 |
| 2,571,277 | Morrow | Oct. 16, 1951 |
| 2,778,509 | Donsbach | Jan. 22, 1957 |

FOREIGN PATENTS

| | | |
|---|---|---|
| 112,629 | Great Britain | Jan. 10, 1919 |